US012754502B2

(12) United States Patent
Wada et al.

(10) Patent No.: US 12,754,502 B2
(45) Date of Patent: Oct. 6, 2026

(54) IMAGE FORMING APPARATUS

(71) Applicant: KYOCERA Document Solutions Inc., Osaka (JP)

(72) Inventors: Minoru Wada, Osaka (JP); Hiroshi Yamazaki, Osaka (JP); Asami Sasaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/053,974

(22) Filed: Feb. 14, 2025

(65) Prior Publication Data

US 2025/0271797 A1 Aug. 28, 2025

(30) Foreign Application Priority Data

Feb. 26, 2024 (JP) ................................ 2024-026709

(51) Int. Cl.
*G03G 15/00* (2006.01)

(52) U.S. Cl.
CPC .................. *G03G 15/5008* (2013.01); *G03G 2215/00599* (2013.01); *G03G 2215/00877* (2013.01)

(58) Field of Classification Search
CPC ..... G03G 15/5008; G03G 2215/00556; G03G 2215/00599; G03G 2215/00603; G03G 2215/00417–00438; G03G 2215/00789–00881
See application file for complete search history.

(56) References Cited

U.S. PATENT DOCUMENTS

| | | | | |
|---|---|---|---|---|
| 2012/0155892 A1* | 6/2012 | Ishida | G03G 15/0887 | 399/53 |
| 2014/0044446 A1* | 2/2014 | Tsukada | G03G 15/0848 | 399/121 |
| 2016/0041509 A1* | 2/2016 | Sekiguchi | G03G 15/168 | 399/314 |
| 2016/0131999 A1 | 5/2016 | Kojima et al. | G03G 15/161 | |
| 2017/0115609 A1 | 4/2017 | Kojima et al. | G03G 15/161 | |

FOREIGN PATENT DOCUMENTS

JP 2016-118760 A 6/2016

* cited by examiner

*Primary Examiner* — Carla J Therrien
(74) *Attorney, Agent, or Firm* — Stein IP, LLC

(57) ABSTRACT

A control portion stops driving a developer carrying member at the end of a development process for a preceding image to be printed on the last sheet of a preceding copy and starts driving the developer carrying member when performing a development process for a subsequent image to be printed on the first sheet of the subsequent copy. Regardless of the length of a development driving suspension period after stopping driving the developer carrying member following the end of the development process for the preceding image until starting driving the developer carrying member to perform the development process for the subsequent image, the control portion maintains suspension of the driving of the developer carrying member during the development driving suspension period.

6 Claims, 6 Drawing Sheets

IMAGE FORMING APPARATUS

INCORPORATION BY REFERENCE

This application is based on and claims the benefit of priority from Japanese Patent Application No. 2024-026709 filed on Feb. 26, 2024, the contents of which are hereby incorporated by reference.

BACKGROUND

The present disclosure relates to an image forming apparatus.

An imaging forming apparatus includes a developing device. The developing device stores developer containing toner. The developing device stirs the toner and supplies the toner to an electrostatic latent image. Thereby the developing device develops the electrostatic latent image into a toner image. The image forming apparatus feeds a sheet and transfers the developed toner image to (prints it on) the sheet.

SUMMARY

According to one aspect of the present disclosure, an image forming apparatus includes a printing portion, a post-processing portion, and a control portion. The printing portion conveys a sheet fed into a conveyance passage and prints an image on the sheet being conveyed. The post-processing portion performs post-processing on the sheet brought in from the printing portion. The printing portion has an image forming portion that forms an image to be printed on the sheet. The image forming portion includes an image carrying member and a developing device. The image carrying member is rotatably supported and has an outer circumferential surface on which an electrostatic latent image is formed. The developing device has a developer carrying member which rotates while carrying developer containing toner and performs a development process to form an image by supplying toner from the rotating developing carrier member to, and thereby developing, the electrostatic latent image on the image carrying member. When performing printing involving post-processing for a plurality of copies in succession, the control portion stops driving the developer carrying member at the end of the development process for a preceding image to be printed on the last sheet of a preceding copy, and starts driving the developer carrying member when performing the development process for the subsequent image to be printed on the first sheet of a subsequent copy. The control portion sets, as a development driving suspension period, a period from the time when the driving of the developer carrying member is stopped following the end of the development process for the preceding image to the time when the driving of the developer carrying member is started to perform the development process for the subsequent image, and maintains suspension of the driving of the developer carrying member during the development driving suspension period regardless of the length of the development driving suspension period.

DETAILED DESCRIPTION

<Configuration of an Image Forming Apparatus>

Figure 1:
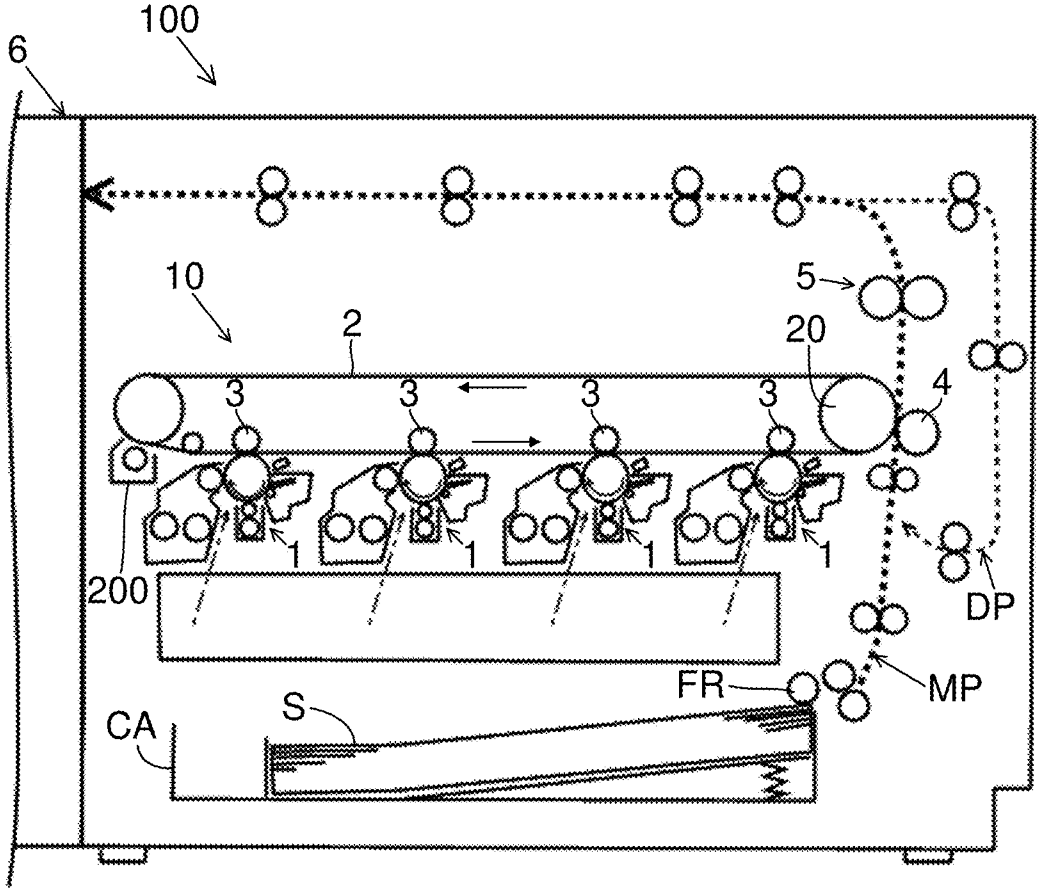
FIG. 1 is a schematic diagram of an image forming apparatus according to an embodiment.

As shown in FIG. 1, according to an embodiment, an image forming apparatus 100 includes a printing portion 10. The image forming apparatus 100 also includes a main conveyance passage MP. The main conveyance passage MP corresponds to a "conveyance passage." The main conveyance passage MP passes across a printing position and a fixing position in this order. A sheet cassette CA is removably mounted in the main body of the image forming apparatus 100. Sheets S are stored in the sheet cassette CA.

In a print job, the printing section 10 feeds a sheet S from the sheet cassette CA into the main conveyance passage MP and conveys the sheet S along the main conveyance passage MP. The printing portion 10 also forms an image with toner. Then the printing portion 10 prints the image on the sheet S being conveyed.

The printing portion 10 includes a feeding roller FR as a feeding portion that feeds sheets S from the sheet cassette CA to the main conveyance passage MP. The feeding roller FR is disposed at a position where it can contact the sheet S in the sheet cassette CA from above. The feeding roller FR is rotatably supported. The feeding roller FR is coupled to a feeding motor, which is not shown, and rotates by being fed with the driving force of the feeding motor. The feeding roller FR contacts the sheet S in the sheet cassette CA from above and rotates in that state. Thus, the feeding roller FR pulls the sheet S from the sheet cassette CA and feeds it to the main conveyance passage MP.

The printing portion 10 includes image forming portions 1. There are four image forming portions 1. The four image forming portions 1 correspond to the colors cyan, magenta, yellow and black respectively. The four image forming portions 1 each form an image (i.e. a toner image) using toner of the corresponding color. In monochrome printing, a black image (i.e. a monochrome image) is formed and printed on the sheet S. In color printing, a color image is formed with a cyan, a magenta, a yellow and a black image overlaid on top of each other and is printed on the sheet S. Thus, the image forming portions 1 form images to be printed on the sheet S.

The four image forming portions 1 have the same configuration; accordingly, the following description will focus on the configuration of one image forming portions 1. Thus, for the configurations of the other image forming portions 1, no description will be repeated, and the following description is to be referred to.

Figure 2:
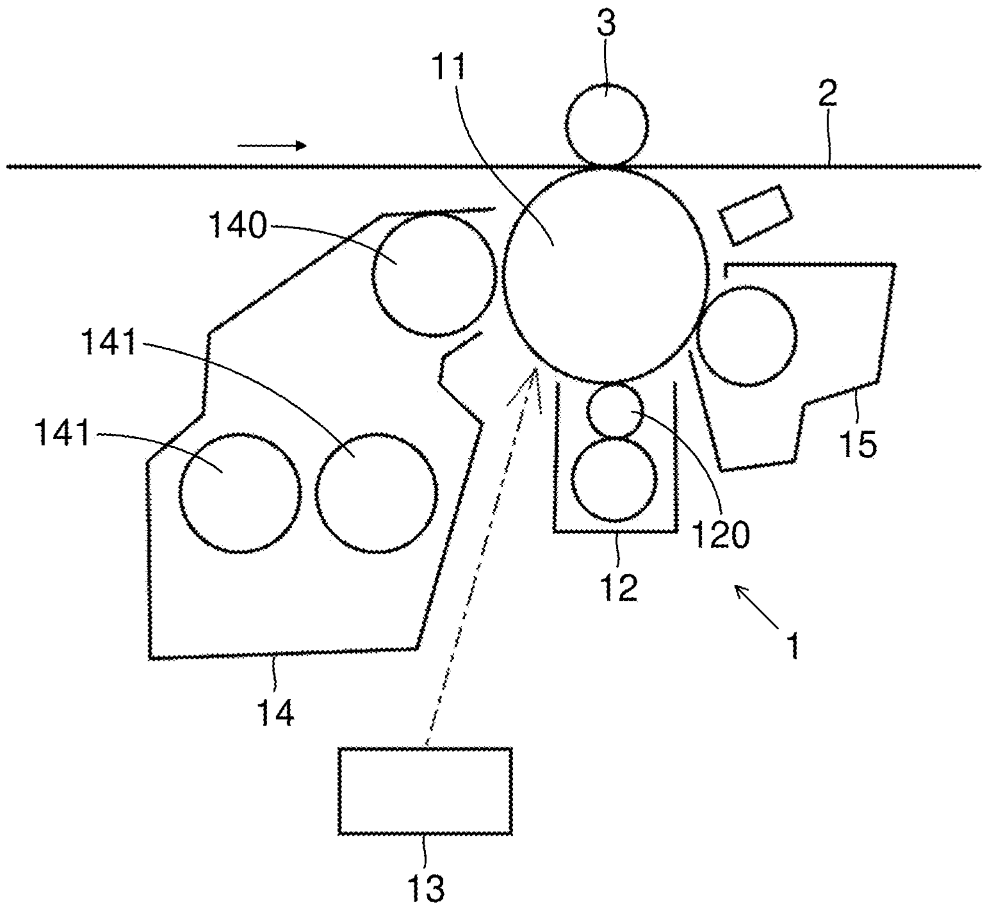
FIG. 2 is a schematic diagram of an image forming portion according to the embodiment.

As shown in FIG. 2, the image forming portion 1 includes a photosensitive drum 11, a charging device 12, an exposure device 13, a developing device 14, and a cleaning device 15. The photosensitive drum 11 corresponds to an "image carrying member." For example, the photosensitive drum 11, the charging device 12, the developing device 14, and the cleaning device 15 constitute a single unit. The exposure device 13 is a unit separate from that unit.

The photosensitive drum 11 is supported so as to be rotatable about an axis extending in one direction (the direction perpendicular to the plane of FIG. 2). The photosensitive drum 11 rotates while carrying a toner image on its outer circumferential surface.

The charging device 12 has a charging roller 120. The charging roller 120 contacts the outer circumferential surface of the photosensitive drum 11. Thus, the charging roller 120 electrostatically charges the outer circumferential surface of the photosensitive drum 11.

The exposure device 13 exposes the outer circumferential surface of the photosensitive drum 11 to light to attenuate the electrostatic charge on it. By exposing the outer circumferential surface of the photosensitive drum 11 to light, the exposure device 13 forms an electrostatic latent image on the outer circumferential surface of the photosensitive drum 11.

The developing device 14 performs a development process. The developing device 14 stores developer containing toner. The developer is a two-component developer containing toner and carrier. The developing device 14 has a developing roller 140. The developer roller 140 corresponds to a "developer carrying member." The developing device 14 also has a stirring screw 141.

The developing roller 140 is supported so as to be rotatable about an axis extending in one direction (the direction perpendicular to the plane of FIG. 2). The developing roller 140 carries developer (i.e., toner) on its outer circumferential surface. A magnetic brush is formed on the outer circumferential surface of the developing roller 140.

The developing device 14 performs, as the development process, a process in which it forms an image by developing the electrostatic latent image on the photosensitive drum 11 by supplying toner to it from the rotating developing roller 140. Specifically, the developing roller 140 rotates while keeping the magnetic brush in contact with the outer circumferential surface of the photosensitive drum 11. This lets the toner attach to the outer circumferential surface of the photosensitive drum 11, forming a toner image on the outer circumferential surface of the photosensitive drum 11.

The stirring screw 141 is supported so as to be rotatable about an axis extending in one direction (the direction perpendicular to the plane of FIG. 2). The stirring screw 141 rotates to stir the developer stored in the developing device 14. For example, the stirring screw 141 is rotated by a driving force from the same driving source (motor) as the developing roller 140. The stirring screw 141 rotates together with the developing roller 140. When the developing roller 140 stops rotating, the stirring screw 141 also stops rotating.

The cleaning device 15 removes the toner remaining on the photosensitive drum 11 downstream, in the rotational direction of the photosensitive drum 11, of the contact position between an intermediate transfer belt 2, which will be described later, and the photosensitive drum 11. The toner that has not moved to the intermediate transfer belt 2 remains on the photosensitive drum 11.

As shown in FIG. 1, the printing portion 10 includes an intermediate transfer belt 2. The intermediate transfer belt 2 corresponds to an "intermediate transfer member" and a "transfer destination member." The intermediate transfer belt 2 is an endless belt. The intermediate transfer belt 2 is rotatably stretched around and rotatably supported by a plurality of tension rollers including a belt drive roller 20. In FIG. 1, the tension rollers other than the belt drive roller 20 are assigned no reference signs.

The belt drive roller 20 is coupled to a belt motor (not shown). The belt drive roller 20 rotates by being fed with a driving force from the belt motor. The intermediate transfer belt 2 rotates by following the belt drive roller 20 as it rotates.

The printing section 10 includes primary transfer rollers 3. There are four primary transfer rollers 3. One primary transfer roller 3 is assigned to each of the colors cyan, magenta, yellow and black. The primary transfer rollers 3 are disposed at the inner circumferential surface side of the intermediate transfer belt 2. The photosensitive drums 11 are disposed at the outer circumferential surface side of the intermediate transfer belt 2. The primary transfer rollers 3 are kept in pressed contact, via the intermediate transfer belt 2, with the photosensitive drums 11 that carry toner images of the corresponding colors.

The printing portion 10 includes a secondary transfer roller 4. The secondary transfer roller 4 is kept in pressed contact with the outer circumferential surface of the intermediate transfer belt 2 at the printing position. The secondary transfer roller 4 holds the intermediate transfer belt 2 between it and the belt drive roller 20 to form a transfer nip with the intermediate transfer belt 2. This forms a transfer nip at the printing position. The main conveyance passage MP passes through the transfer nip.

The printing portion 10 includes a belt cleaning unit 200. The belt cleaning unit 200 cleans the outer circumferential surface of the intermediate transfer belt 2. The belt cleaning unit 200 removes the toner remaining on the surface of the intermediate transfer belt 2 downstream of the printing position in the rotation direction of the intermediate transfer belt 2.

In a print job, a sheet S is conveyed toward the printing position (i.e., the transfer nip). The sheet S conveyed passes through the transfer nip. Thus, the intermediate transfer belt 2 brings its outer circumferential surface into contact with the sheet S downstream, in the belt rotation direction, of the contact position with the photosensitive drum 11.

The image forming portions 1 forms toner images using toner of the corresponding colors. The primary transfer rollers 3 primarily transfer the toner images to the outer circumferential surface of the intermediate transfer belt 2. The intermediate transfer belt 2 rotates while carrying the toner images. The secondary transfer roller 4 secondarily transfers the toner images to the sheet S passing through the transfer nip.

In color printing, toner images are formed in all the four image forming portions 1. The toner images of the different colors are primarily transferred to the intermediate transfer belt 2 sequentially so as to be overlaid on top of each other. Thus, a full-color toner image is formed on the intermediate transfer belt 2. The full-color toner image is secondarily transferred to the sheet S.

In monochrome printing, the three image forming portions 1 that use color toner (cyan, magenta, and yellow toner) do not form toner images; only one image forming portion 1 that uses black toner forms a toner image. Thus, a monochrome toner image is formed on the intermediate transfer belt 2. The monochrome toner image is secondarily transferred to the sheet S.

The image forming apparatus 100 also includes a fixing portion 5. The fixing portion 5 includes a heating roller and a pressing roller. The fixing portion 5 is disposed at the fixing position. The heating roller incorporates a heater. The heating roller and the pressure roller are kept in pressed contact with each other to form a fixing nip at the fixing position.

In a print job, a sheet S passes across the fixing position. Thus, the sheet S is nipped in the fixing nip. The fixing portion 5 heats the sheet S passing across the fixing position. Also, a pressure is applied to the sheet S at the fixing position. The fixing portion 5 heats and presses the sheet S to fix the toner image to the sheet S.

The printing portion 10 includes a conveyance portion, though no reference sign is assigned to it. The conveyance portions include a plurality of pairs of conveyance rollers. Each pair of conveyance rollers includes a pair of rollers. The pair of rollers has a conveyance nip between the rollers. The pair of conveyance rollers rotates to convey a sheet S that has entered the conveyance nip.

The conveyance portion transports sheets S along the main conveyance passage MP. The conveyance portion conveys sheets S also along a duplex printing conveyance passage DP, which will be described later.

The printing portion 10 can perform not only a simplex printing job to print an image on only one side of a sheet S but also a duplex printing job to print images on both sides of a sheet S. For the duplex printing job, the image forming apparatus 100 includes a duplex printing conveyance passage DP.

The duplex printing conveyance passage DP branches off the main conveyance passage MP at a branch position downstream, in the sheet conveyance direction, of the fixing position along the main conveyance passage MP. The duplex printing conveyance passage DP joins the main conveyance passage MP at a junction position upstream, in the sheet conveyance direction, of the printing position along the main conveyance passage MP.

When the job being performed is a simplex printing job, the sheet S passes through the transfer nip only once, and a transferring process is performed once on the sheet S passing through the transfer nip. After the first-time transferring process, the sheet S is conveyed into a post-processing portion 6, which will be described later.

When the job being performed is a duplex printing job, the sheet S passes through the transfer nip twice so that a transferring process is performed once for each of the front and back sides of sheet S. Specifically, when the sheet S passes through the transfer nip first time, the transferring process is performed on one side of sheet S. When after the first-time transferring process the trailing end of sheet S passes across the branch position, the sheet S is switched back. Thus, the sheet S is pulled into the duplex printing conveyance passage DP from its trailing end.

The sheet S is then conveyed along the duplex printing conveyance passage DP. Then, the sheet S in the duplex printing conveyance passage DP is returned to the main conveyance passage MP at the junction position. The sheet S returned to the main conveyance passage MP is conveyed along the main conveyance passage MP and passes through the transfer nip again. Here, the front and back sides of the sheet S are reversed compared with when it passed there the previous time. Thus, when the sheet S passes through the transfer nip second time, the transferring process is performed on the other side of the sheet S, which is opposite to one side of the sheet S.

The image forming apparatus 100 includes a post-processing portion 6. The post-processing portion 6 performs post-processing on sheets S brought in from the printing portion 10 (i.e., sheets S on which images have been printed). For example, the post-processing portion 6 is an optional device that is removably attached to the main body of the image forming apparatus 100. In other words, a post-processing device is attached to the main body of the image forming apparatus 100, and this post-processing device functions as the post-processing portion 6.

Figure 3:
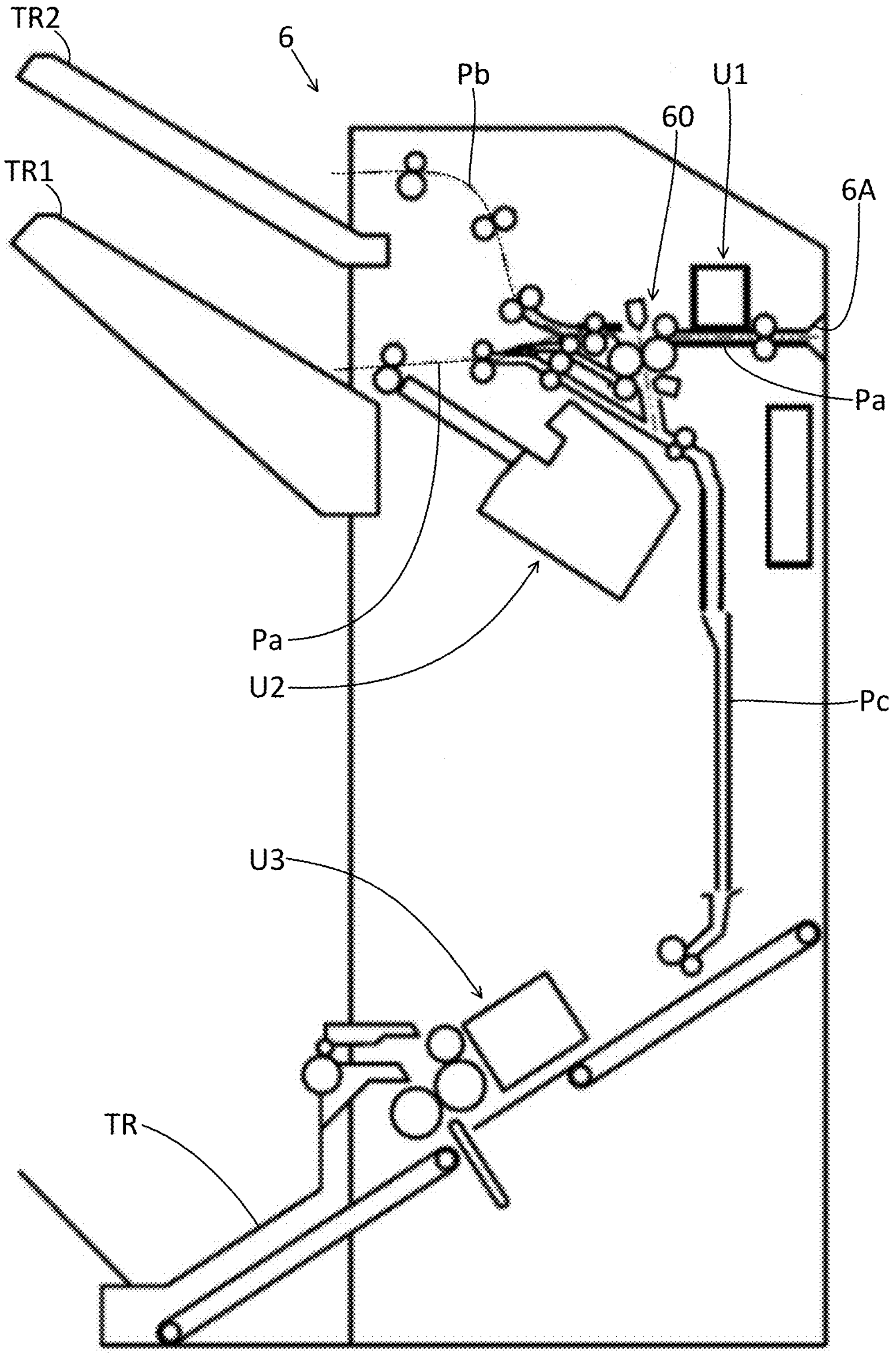
FIG. 3 is a schematic diagram of a post-processing portion according to the embodiment.

As shown in FIG. 3, the post-processing portion 6 has an introduction port 6A. The introduction port 6A is provided at the side of the post-processing portion 6 where it is connected to the main body of the image forming apparatus 100. The post-processing portion 6 receives the sheet S from the printing portion 10 via the introduction port 6A.

The post-processing portion 6 includes a first discharge tray TR1 and a second discharge tray TR2. The post-processing portion 6 also includes a first conveyance passage Pa and a second conveyance passage Pb.

The first and second discharge trays TR1 and TR2 are provided at the side of the post-processing portion 6 opposite from its side connected to the main body of the image forming apparatus 100. The first discharge tray TR1 is a main discharge tray. The second discharge tray TR2 is disposed above the first discharge tray TR1.

The first conveyance passage Pa is a main conveyance passage. The first conveyance passage Pa leads from the introduction port 6A to a discharge port (no reference sign assigned) for the sheet S to the first discharge tray TR1. The second conveyance passage Pb branches off the first conveyance passage Pa and leads to a discharge port (no reference sign assigned) for the sheet S to the second discharge tray TR2 (omitted).

The post-processing portion 6 includes a punch unit U1, a staple unit U2, and a booklet unit U3. The punch unit U1, the staple unit U2, and the booklet unit U3 perform post-processing. The post-processing portion 6 further includes a folding unit 60 as a unit that performs post-processing.

The punch unit U1 is disposed along the conveyance path of the first conveyance passage Pa. The punch unit U1 performs, as post-processing, punching to form punch holes in a sheet S conveyed along the first conveyance passage Pa.

The stapling unit U2 performs, as post-processing, stapling to bind a bundle of sheets S with a staple. When stapling is performed, sheets S conveyed along the first conveyance passage Pa are stacked on a processing tray (no reference sign assigned). Then, stapling is performed on the bundle of sheets S on the processing tray, and the bundle of sheets S is discharged to the first discharge tray TR1. If stapling is not performed (including a case where only punching is performed), the sheets S can be discharged to the second discharge tray TR2. A configuration is also possible where, even when stapling is not performed, the sheets S can be discharged to the first discharge tray TR1.

The booklet unit U3 performs booklet formation as post-processing. Specifically, the booklet unit U3 has a middle-binding portion (no reference sign assigned) that binds a middle part of a bundle of sheets S with a staple. The booklet unit U3 also has a middle-folding portion (no reference sign assigned) that folds the bundle of sheets S in the middle.

For example, the post-processing portion 6 includes a third conveyance passage Pc that branches off the first conveyance passage Pa and extends downward. The third conveyance passage Pc connects to the booklet unit U3. When booklet formation is performed, sheets S are conveyed to the booklet unit U3 via the third conveyance passage Pc.

The post-processing portion 6 includes a discharge tray TR for booklets. The discharge tray TR is provided at the side of the post-processing portion 6 opposite from its side connected to the main body of the image forming apparatus 100. The discharge tray TR is disposed below the first discharge tray TR1 The booklet unit U3 discharges booklets formed through booklet formation to the discharge tray TR.

Figure 4:
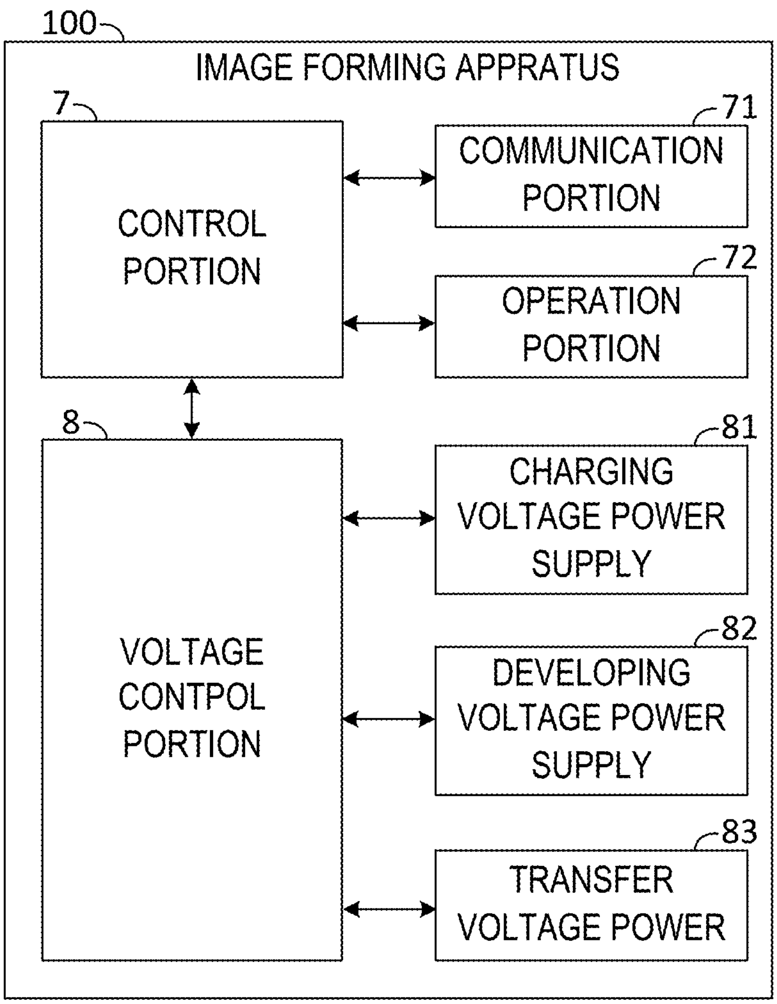
FIG. 4 is a block diagram of the image forming apparatus according to the embodiment.

As shown in FIG. 4, the image forming apparatus 100 includes a control portion 7. The control portion 7 includes processing circuits such as a CPU and an ASIC. The control portion 7 also includes memory devices such as a ROM and a RAM. The control portion 7 controls the print jobs performed by the image forming apparatus 100.

The control portion 7 controls, as control for print jobs, the feeding of sheets S from the sheet cassette CA to the main conveyance passage MP. For this purpose, the control portion 7 controls the feeding motor and other components coupled to the feeding roller FR. By controlling the feeding motor, the control portion 7 switches the feeding roller FR between a rotating state and a stationary state. Thus, the control portion 7 controls sheet S feeding operation by the feeding roller FR.

The control portion 7 controls image formation by the four image forming portions 1. For example, the control portion 7 controls the rotation of the rotating members such as the photosensitive drum 11 and the developing roller 140. Thus, the control portion 7 controls the motors that rotate those rotating members. The control portion 7 can switch the developing roller 140 between a rotating state and a stationary state.

The control portion 7 also controls post-processing by the post-processing portion 6. A dedicated control portion (referred to here as the post-processing control portion) that controls post-processing by the post-processing portion 6 can be separately provided. In that case, the control portion 7 communicates with the post-processing control portion and makes the post-processing control portion control post-processing by the post-processing portion 6.

The image forming apparatus 100 includes a communication portion 71. The communication portion 71 includes a communication circuit, a memory for communication, a connector for communication, and the like. The communication portion 71 is communicatively connected to an external device via a network such as a LAN. The external device can be a user terminal. A personal computer (PCs), a smartphone or a tablet computer can be the user terminal The control portion 7 communicates with the external device using the communication portion 71. For example, print data for a print job is transmitted from the external device (user terminal) to the image forming apparatus 100. The print data includes image data to be printed in the print job.

The control portion 7 adds print jobs corresponding to the received print data to a queue. The control portion 7 performs the print jobs in the queue in the order of receipt. When the queue has a plurality of print jobs, these are performed in succession.

The control portion 7 determines whether a print job in the queue is color printing or monochrome printing. When monochrome printing is performed, the control portion 7 does not make the three image forming portions 1 corresponding to cyan, magenta, and yellow form images, and makes the image forming portions 1 corresponding to black form an image. On the other hand, when color printing is performed, the control portion 7 makes all the image forming portions 1 form toner images.

The image forming apparatus 100 includes an operation portion 72. The operation portion 72 is an operation panel and includes a touch screen. The operation portion 72 accepts from the user instructions to perform a print job and the like. The operation portion 72 is connected to the control portion 7. The control portion 7 recognizes the instructions and the like that the operation portion 72 receives from the user.

The image forming apparatus 100 also includes a voltage control portion 8, a charging voltage power supply 81, a developing voltage power supply 82, and a transfer voltage power supply 83. The voltage control portion 8 includes a voltage control circuit. The charging voltage power supply 81 applies a charging voltage to the charging roller 120. The developing voltage power supply 82 applies a developing voltage to the developing roller 140. The developing voltage is a voltage having an AC voltage superimposed on a DC voltage. The transfer voltage power supply 83 applies a transfer voltage to the primary transfer roller 3 and the secondary transfer roller 4 individually. The transfer voltage is a voltage of the opposite polarity to the toner polarity.

The voltage control portion 8 is connected to the control portion 7. The voltage control portion 8 controls the charging voltage power supply 81, the developing voltage power supply 82, and the transfer voltage power supply 83 based on control signals output from the control portion 7. In other words, the control portion 7 controls the charging voltage power supply 81, the developing voltage power supply 82, and the transfer voltage power supply 83. In yet other words, the control portion 7 controls the application of voltages to the rollers including the developing roller 140.

<Control for Conveyance of Sheets>

In a print job that involves printing on a plurality of sheets, a plurality of sheets S are conveyed successively. When the control portion 7 receives an instruction to perform a print job involving printing on a plurality of sheets, it starts the feeding operation of the feeding roller FR. The feeding roller FR performs, as the feeding operation, operation in which it rotates while in contact with the topmost sheet S in the sheet cassette CA from above. This starts the feeding of the sheet S. Then, the sheet S reaches the pair of conveyance rollers downstream of the feeding roller FR in the sheet conveyance direction.

When a predetermined time has passed from the start of sheet S feeding, the control portion 7 stops the feeding operation of the feeding roller FR. Now, the sheet S has reached the pair of conveyance rollers downstream of the feeding roller FR in the sheet conveyance direction. Thus, the sheet S is conveyed even after the feeding operation of the feeding roller FR is stopped. After that, the control portion 7 makes the feeding roller FR repeat the feeding operation until the number of sheets S conveyed reaches the number of sheets to be printed.

In a print job involving printing on a plurality of copies, the copy-to-copy interval between a preceding copy and the subsequent copy is adjusted according to the type of post-processing performed in the post-processing portion 6. The copy-to-copy interval is the time interval between the leading end of the last sheet S of the preceding copy and the leading end of the first sheet S of the subsequent copy. In other words, the copy-to-copy interval is the time from the start of feeding the last sheet S of the preceding copy to the start of feeding the first sheet S of the subsequent copy.

For example, when post-processing involving middle-folding is performed in the post-processing portion 6, the control portion 7 sets the copy-to-copy interval to 4 to 5 seconds. When post-processing involving middle-binding is performed in the post-processing portion 6, the control portion 7 sets the copy-to-copy interval to 5.5 to 6 seconds. When post-processing involving triple-folding is performed in the post-processing portion 6, the control portion 7 sets the copy-to-copy interval to 6 to 8 seconds.

<Timing of Driving the Developing Roller>

Figure 5:
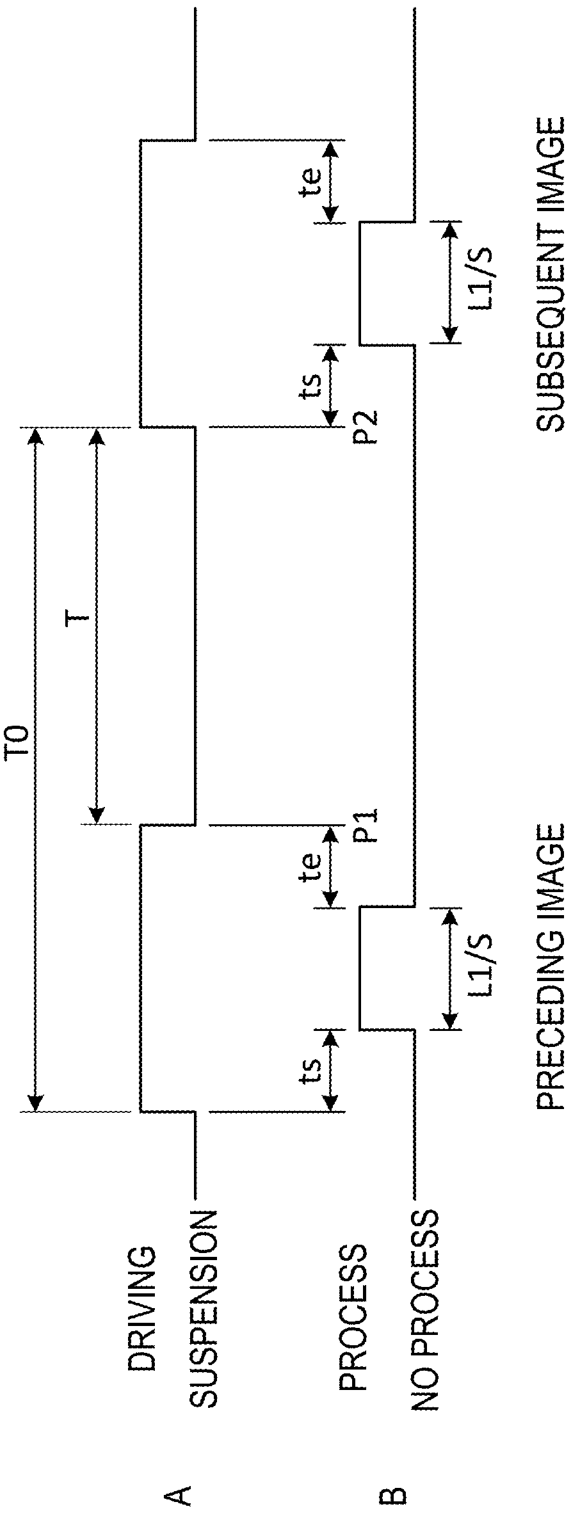
FIG. 5 is a diagram showing a development driving suspension period when simplex printing is performed in the printing portion according to the embodiment.

Now, with reference to FIGS. 5 and 6, the timing of driving the developing roller 140 when printing involving post-processing is performed for a plurality of copies in succession will be described. FIG. 5 shows the timing used when the job performed is a simplex printing job, and FIG. 6 shows the timing used when the job performed is a duplex printing job.

Figure 6:
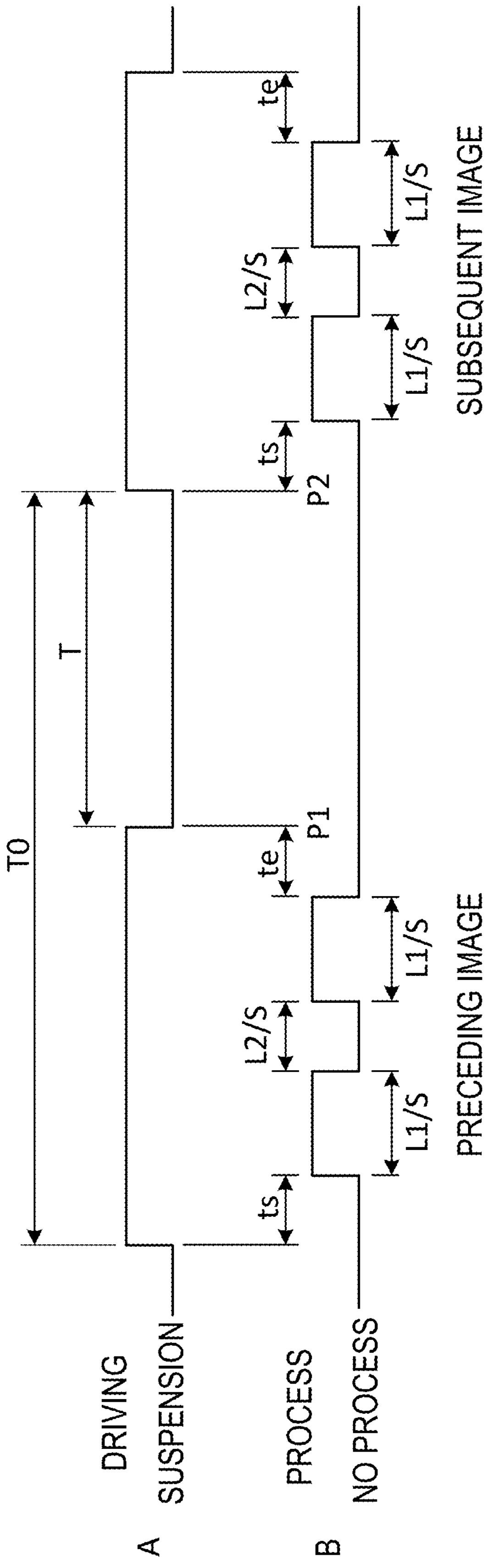
FIG. 6 shows the development driving suspension period when duplex printing is performed in the printing portion according to the embodiment.

In FIGS. 5 and 6, time TO corresponds to the copy-to-copy interval. In FIGS. 5 and 6, "A" indicates the timing with which the developing roller 140 is driven (i.e., rotated) and stops being driven. "B" indicates the timing with which the development process is started and ended.

When printing involving post-processing is performed for a plurality of copies in succession, at the end of the development process for the preceding image to be printed on the last sheet S of the preceding copy, the control portion 7 stops driving the developing roller 140. Then, when performing the development process for the subsequent image to be printed on the first sheet S of the subsequent copy, the control portion 7 starts driving the developing roller 140.

In other words, when printing involving post-processing is performed for a plurality of copies in succession, the control portion 7 stops driving the developing roller 140 at a first time point P1 after the end of the development process for the preceding image to be printed on the last sheet S of the preceding copy. Then, the control portion 7 starts driving the developing roller 140 at a second time point P2 before starting the development process for the subsequent image to be printed on the first sheet S of the subsequent copy.

Here, between the preceding copy and the subsequent copy, no development process is performed and so no development driving is necessary. That is, between the preceding copy and the subsequent copy, no stirring of toner by development driving is necessary. The longer the toner is stirred, the more it deteriorates, leading to image quality degradation such as reduced density. Thus, it is preferable to suspend development driving between the preceding copy and the subsequent copy.

Accordingly, in this embodiment, the control portion 7 sets, as a development driving suspension period, the period T from the time when the driving of the developing roller 140 is stopped following the completion of the development process for the preceding image to the time when the driving of the development roller 140 is started to perform the development process for the next image. In other words, the control portion 7 sets the period T from the first time point P1 to the second time point P2 as the development driving suspension period. Then, the control portion 7 maintains suspension of the driving of the developing roller 140 during the development driving suspension period T regardless of its length.

Thus, in this embodiment, the driving of the developer roller 140 can be suspended for a longer time between the preceding copy and the subsequent copy. That is, unnecessary development driving is suppressed. Thus, image quality degradation can be reduced.

In this embodiment, the control portion 7 makes the plurality of the image forming portions 1 perform the development process in a predetermined order so that the images formed by the plurality of the image forming portions 1 are superimposed on each other on the intermediate transfer belt 2. With this configuration, the control portion 7 sets a development driving suspension period T for each of the plurality of image forming portions 1 and maintains suspension of the driving of the developing roller 140 during the development driving suspension period T. This helps suppress unnecessary development drive in all of the developing portions 14.

In this embodiment, the control portion 7 suspends the application of the AC voltage to the developing roller 140 during the development driving suspension period T. Thus, with simple control, it is possible to suppress the scattering of toner from the developing portion 14 during the development driving suspension period T. Reducing the amount of scattering toner helps suppress contamination with the scattered toner.

In this embodiment, the control portion 7 uses different formulas to determine the length of the development driving suspension period T (in other words, the duration for which to keep the developing roller 140 stationary) between when an image is printed on only one side of the sheet S and when images are printed on both sides of the sheet S. The length of the development driving suspension period T (T1) when an image is printed on only one side of the sheet S is determined by Formula (1) below. On the other hand, when images are printed on both sides of the sheet S, the length of the development drive stoppage period T2 is determined by Formula (2) below.

$$T1 = T0 - ts - te - L1/S \tag{1}$$

$$T2 = T0 - ts - te - (2 \times L1 + L2)/S \tag{2}$$

In Formulas (1) and (2), the symbol T0 represents the time from the start of feeding the last sheet S of the preceding copy to the main conveyance passage MIP to the start of feeding the first sheet S of the subsequent copy to the main conveyance passage MP (i.e., the copy-to-copy interval). The symbol te represents the time from the end of the development process for the preceding image to the suspension of driving the developing roller 140. The symbol ts represents the time from the start of driving the developing roller 140 to perform the development process for the subsequent image to the start of the development process for the subsequent image. The symbol L1 is the length, in the conveyance direction, of the sheet S conveyed along the main conveyance passage MP. The symbol L2 is the length, in the conveyance direction, between the trailing end of the preceding sheet S and the leading end of the subsequent sheet S within the same copy.

According to Formulas (1) and (2), the length of the development driving suspension period T can be easily set appropriately.

In this embodiment, the time from the end of the development process for the preceding image to the suspension of driving the developing roller 140 (i.e., time te) is longer than the time from the end of the development process to the end of the transfer of the image developed in the development process to the intermediate transfer belt 2 (corresponding to a "transfer destination member"). This prevents the inconvenience of image quality degradation caused by vibration or the like that occurs when the driving of the developing roller 140 is stopped.

In this embodiment, the time from the start of driving the developing roller 140 to perform the development process for the subsequent image to the start of the development process for the subsequent image (i.e., time ts) is longer than the time for the developing roller 140 to make two turns. Thus, in the period before the start of the development process for the subsequent image, the toner on the developing roller 140 moves to the photosensitive drum 11 and is removed by the cleaning device 15. In other words, the toner that causes toner fog is removed. This helps further suppress image quality degradation.

The embodiment disclosed herein should be understood to be in every respect illustrative and not restrictive. The scope of the present disclosure is defined not by the embodiment described above but by the appended claims and encompasses any modifications within a scope equivalent in significance to the claims.

What is claimed is:

1. An image forming apparatus comprising:

a printing portion that conveys a sheet fed into a conveyance passage and that prints an image on the sheet being conveyed;

a post-processing portion that performs post-processing on the sheet brought in from the printing portion; and a control portion, wherein the printing portion has an image forming portion that forms an image to be printed on the sheet, the image forming portion includes:

an image carrying member that is rotatably supported and that has an outer circumferential surface on which an electrostatic latent image is formed; and a developing device that has a developer carrying member which rotates while carrying developer containing toner, the developing device performing a development process to form an image by supplying toner from the rotating developer carrying member to, and thereby developing, the electrostatic latent image on the image carrying member, when performing printing involving the post-processing for a plurality of copies in succession, the control portion stops driving the developer carrying member at an end of the development process for a preceding image to be printed on a last sheet of a preceding copy, and starts driving the developer carrying member when performing the development process for a subsequent image to be printed on a first sheet of a subsequent copy, and the control portion sets, as a development driving suspension period, a period from a time when driving of the developer carrier is stopped following completion of the development process for the preceding image to a time when the driving of the developer carrying member is started to perform the development process for the subsequent image, and maintains suspension of the driving of the developer carrying member during the development driving suspension period regardless of a length of the development driving suspension period, and when T0 represents a time from a start of feeding the last sheet of the preceding copy to the conveyance passage to a start of feeding the first sheet of the subsequent copy to the conveyance passage, te represents a time from an end of the development process for the preceding image to suspension of driving the developer carrying member, ts represents a time from a start of driving the developer carrying member to perform the development process for the subseguent image to a start of the development process for the subsequent image, S represents a linear velocity of the image carrying member L1 represents a length, in a conveyance direction, of the sheet conveyed along the conveyance passage, and L2 represents a length, in the conveyance direction, between a trailing end of the preceding sheet and a leading end of the subseguent sheet within a same copy, then a length T1 of the development driving suspension period when an image is printed on only one side of the sheet is determined by Formula (1) below, and a length T2 of the development driving suspension period when images are printed on both sides of the sheet is determined by Formula (2) below.

$$T1 = T0 - ts - te - L1/S \tag{1}$$

$$T2 = T0 - ts - te - (2 \times L1 + L2)/S. \tag{2}$$

2. The image forming apparatus according to claim 1, wherein the printing portion includes:

a plurality of the image forming portions that form images of colors different from each other; and an intermediate transfer member that is rotatably supported and to which the images formed in the plurality of image forming portions are primarily transferred, the images transferred to the intermediate transfer member are secondarily transferred to a sheet and thereby an image is printed on the sheet, the control portion makes the plurality of image forming portions perform the development process in a predetermined order such that the images formed by the plurality of image forming portions are superimposed on each other on the intermediate transfer member, and the control portion sets the development driving suspension period for each of the plurality of image forming portions and maintains suspension of the driving of the developer carrying member during the development driving suspension period.

3. The image forming apparatus according to claim 1, further comprising:

a developing voltage power supply that applies a developing voltage to the developer carrying member when the developing device performs the developing process, wherein the developing voltage is a voltage that has an AC voltage superimposed on a DC voltage, the control portion suspends application of the AC voltage to the developer carrying member during the development driving suspension period.

4. The image forming apparatus according to claim 1, wherein the time from the end of the development process for the preceding image to the suspension of driving the developer carrying member is longer than a time from the end of the development process for the preceding image to an end of transfer of the image developed in the development process for the preceding image to a transfer destination member.

5. The image forming apparatus according to claim 1, wherein the time from the start of driving the developer carrying member to perform the development process for the subsequent image to the start of the development process for the subsequent image is longer than a time for the developer carrying member to make two turns.

6. The image forming apparatus according to claim 1, wherein the post-processing includes folding the sheet.

* * * * *